United States Patent
Princinsky et al.

(10) Patent No.: US 9,875,841 B2
(45) Date of Patent: Jan. 23, 2018

(54) SYSTEMS AND METHODS FOR A DC PHASEBACK CHOKE

(71) Applicants: Daniel Princinsky, Saginaw, MI (US); William Hinton, Reese, MI (US)

(72) Inventors: Daniel Princinsky, Saginaw, MI (US); William Hinton, Reese, MI (US)

(73) Assignee: APPLIED ENERGY LLC, Saginaw, MI (US)

(*) Notice: Subject to any disclaimer, the term of this patent is extended or adjusted under 35 U.S.C. 154(b) by 573 days.

(21) Appl. No.: 14/261,003

(22) Filed: Apr. 24, 2014

(65) Prior Publication Data

US 2014/0321172 A1 Oct. 30, 2014

Related U.S. Application Data

(60) Provisional application No. 61/815,546, filed on Apr. 24, 2013.

(51) Int. Cl.
*H02M 1/12* (2006.01)
*H01F 27/28* (2006.01)
*H01F 17/04* (2006.01)
*H01F 17/00* (2006.01)

(52) U.S. Cl.
CPC ....... *H01F 27/2823* (2013.01); *H01F 17/045* (2013.01); *H02M 1/126* (2013.01); *H01F 2017/0093* (2013.01); *H02M 2001/123* (2013.01)

(58) Field of Classification Search
CPC .............. H01F 27/2823; H01F 17/045; H01F 2017/0093; H02M 1/126; H02M 2001/123; H01M 1/126; H01M 2001/123
USPC ........................................................ 361/270
See application file for complete search history.

(56) References Cited

U.S. PATENT DOCUMENTS

| | | | | |
|---|---|---|---|---|
| 3,340,458 A | * | 9/1967 | Keller | H02M 1/14 333/177 |
| 4,425,565 A | * | 1/1984 | Johns | H01Q 9/04 333/175 |
| 5,184,045 A | * | 2/1993 | Im | H01J 23/15 315/39.51 |
| 7,161,814 B2 | * | 1/2007 | Uchida | H02M 3/335 363/21.12 |
| 2009/0065100 A1 | * | 3/2009 | Yoshizawa | B22D 11/0611 148/305 |
| 2012/0075036 A1 | * | 3/2012 | Kameya | H03H 7/427 333/140 |

FOREIGN PATENT DOCUMENTS

| | | | | |
|---|---|---|---|---|
| GB | 000318159 | * | 12/1929 | ............. H02M 1/14 |
| JP | 06245486 A | * | 9/1994 | |
| JP | 2003249411 A | * | 9/2003 | |

* cited by examiner

*Primary Examiner* — Zeev V Kitov
(74) *Attorney, Agent, or Firm* — Baker Botts L.L.P.

(57) ABSTRACT

Phaseback DC choke includes a common core, a first coil formed about the common core, and a second coil formed about the common core in parallel opposing configuration relative the first coil. A DC circuit including a Phaseback DC choke is also provided.

6 Claims, 2 Drawing Sheets

SYSTEMS AND METHODS FOR A DC PHASEBACK CHOKE

CROSS-REFERENCE TO RELATED APPLICATIONS

This application claims priority to U.S. Provisional Patent Application No. 61/815,546, which is incorporated by reference herein in its entirety.

BACKGROUND

Chokes are widely used in electronics to block higher-frequency alternating current (AC) in an electrical circuit, while allowing lower frequency or DC current to pass. A choke can generally include a coil of insulated wire, which can be wound on a magnetic core. In operation, the impedance of the choke generally increases with frequency. As such, the low electrical resistance can allow both AC and DC current to pass with relatively low power loss, but can limit or reduce the amount of AC current passing therethrough due to the reactance of the coil.

Certain types of chokes, such as common-mode choke, can be useful for prevention of electromagnetic interference (EMI) and radio frequency interference (RFI), for example from power supply lines, and for protection of electronic equipment sensitive to AC current noise. Common-mode chokes can include two coils wound on a core. In operation, the two coils can pass equal but opposite differential currents while blocking common-mode currents. However, there remains a continued need for improved chokes and techniques to reduce or prevent damage to electronic equipment sensitive to AC current noise.

SUMMARY

In accordance with certain embodiments of the disclosed subject matter, a DC Phaseback choke is provided. The DC Phaseback choke includes a common core, a first coil formed about the common core, and a second coil formed about the common core in parallel opposing configuration relative the first coil.

In some embodiments, the first coil and the second coil have an equal number of windings about the common core. The first coil and the second coil can be configured as a single coil having a first coil portion and a second coil portion. Alternatively, the first coil and the second coil are configured as two separate coils. The two separate coils can have a coefficient of coupling of about 1.

In some embodiments, the choke can include a filter capacitor joined in parallel to the first and second coils. The filter capacitor can have a capacitance within a range of about 15,000 μF to 4 F. As embodied herein, the filter capacitor can have a capacitance of about 15,000 μF.

In some embodiments, the first and second coils each can include copper wire. The common core can include soft iron or ferrite.

In accordance with another aspect of the disclosed subject matter, a DC Phaseback choke is provided. The DC circuit can include a DC power supply having a current output terminal, a load device having a current input terminal, and a Phaseback DC choke having a first node, a second node, a third node, and a fourth node. The choke includes a common core having a first end and a second end, a first coil formed about the common core and defining the first node proximate the first end and the third node proximate the second end, and a second coil formed about the common core in parallel opposing configuration relative the first coil and defining the second node proximate the first end and the fourth node proximate the second end. The current output terminal of the power supply is joined to the first coil at the first node, the current input terminal of the load device is joined to the second coil at the second node, and the third node is joined to the fourth node. The Phaseback DC choke can include any of the features described herein.

DETAILED DESCRIPTION

Figure 1A:
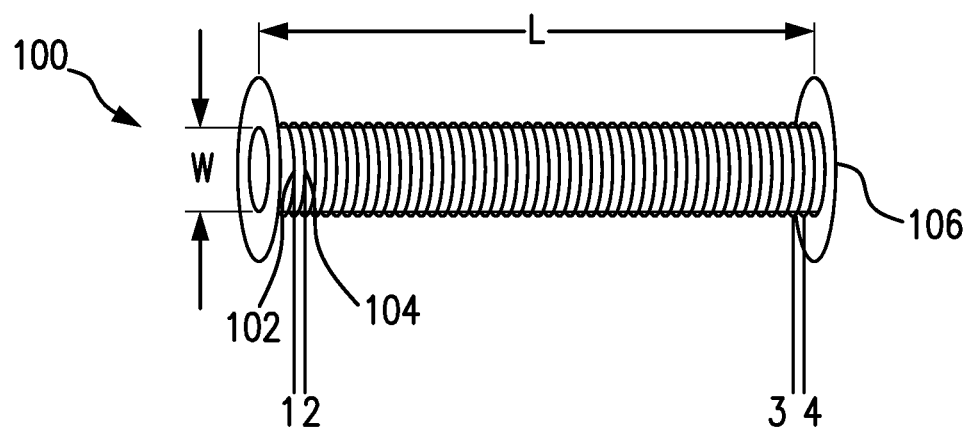
FIG. 1A is a perspective view of an exemplary DC Phaseback choke in accordance with the disclosed subject matter.

The apparatus and methods presented herein can be used for a variety of electronic circuits, such as analog circuits and digital circuits, and any electronic devices implementing such circuits. The apparatus and methods described herein can be particularly suited for DC electronic circuits sensitive to AC current noise, including small-scale electronic circuits, such as microcircuits and nanocircuits, and electronic devices implementing such circuits.

In accordance with the disclosed subject matter herein, the disclosed subject matter includes a DC Phaseback choke. The DC Phaseback choke includes a common core, a first coil formed about the common core, and a second coil formed about the common core in parallel opposing configuration relative the first coil.

Reference will now be made in detail to the various exemplary embodiments of the disclosed subject matter, exemplary embodiments of which are illustrated in the accompanying drawings. Methods of forming and using the DC Phaseback chokes of the disclosed subject matter will be described in conjunction with the detailed description of the system.

The accompanying figures, where like reference numerals refer to identical or functionally similar elements throughout the separate views, serve to further illustrate various embodiments and to explain various principles and advantages all in accordance with the disclosed subject matter. Hence, features depicted in the accompanying figures support corresponding features and combinations thereof of the claimed subject matter. For purpose of explanation and illustration, and not limitation, exemplary embodiments of the DC Phaseback choke in accordance with the disclosed subject matter are shown in FIGS. 1A-2.

Figure 2:
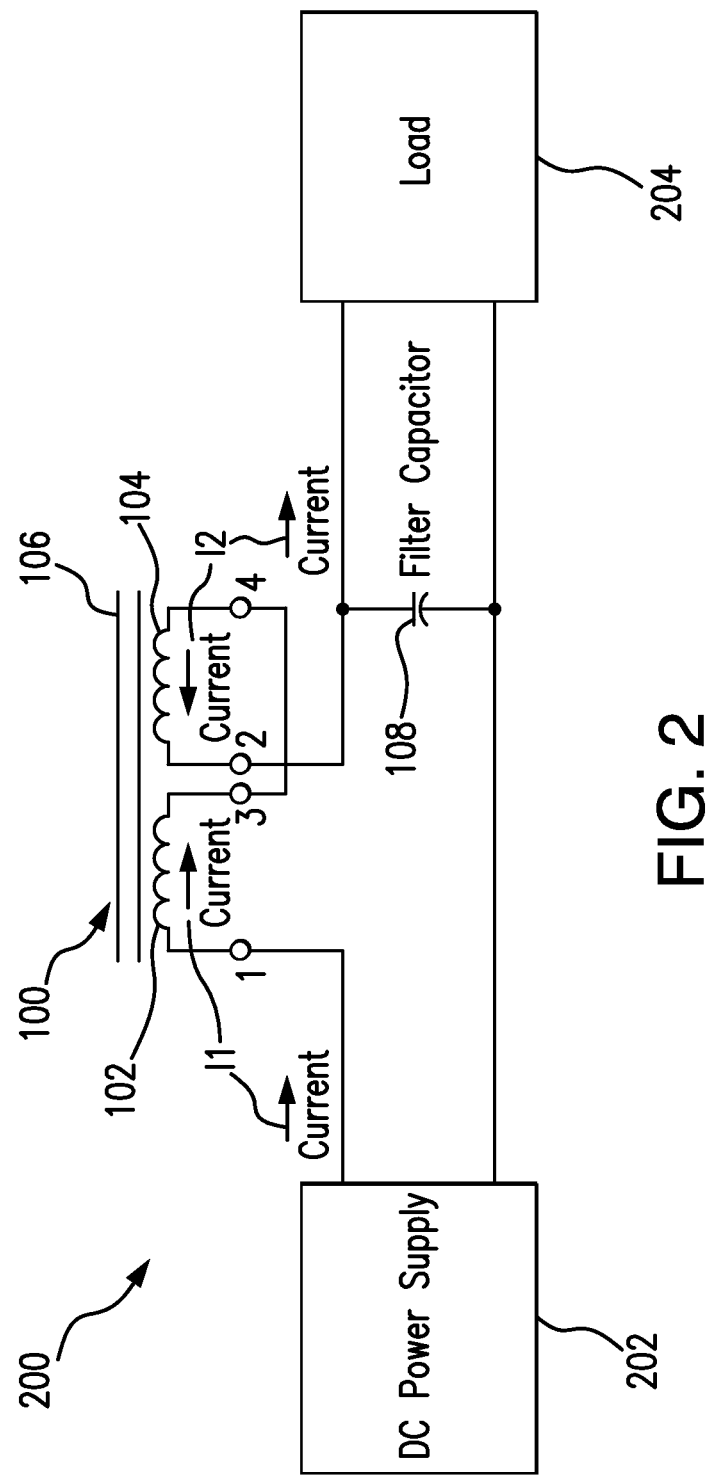
FIG. 2 is a schematic diagram illustrating an exemplary DC circuit including the DC Phaseback choke of FIG. 1A in accordance with the disclosed subject matter.

Referring now to an illustrative embodiment of FIG. 1A, an exemplary Phaseback DC choke 100 according to the disclosed subject matter can include a first coil 102 and a second coil 104 formed on a common core 106. As embodied herein, first coil 102 and second coil 104 each have an equal number of windings about common core 106. For example, and as embodied herein, each coil 102, 104 can have at least 50 windings about common core 106, which can provide a suitably high coefficient of coupling. Additionally, and as embodied herein, first coil 102 and second coil 104 are configured in a parallel opposing configuration relative to each other.

As embodied herein, first coil 102 and second coil 104 can be configured as a single coil having a first coil portion and a second coil portion. Alternatively, first coil 102 and second coil 104 can be configured as two separate coils formed on common core 106 and having a high coefficient of coupling relative to each other, for example about 1.

Figure 1B:
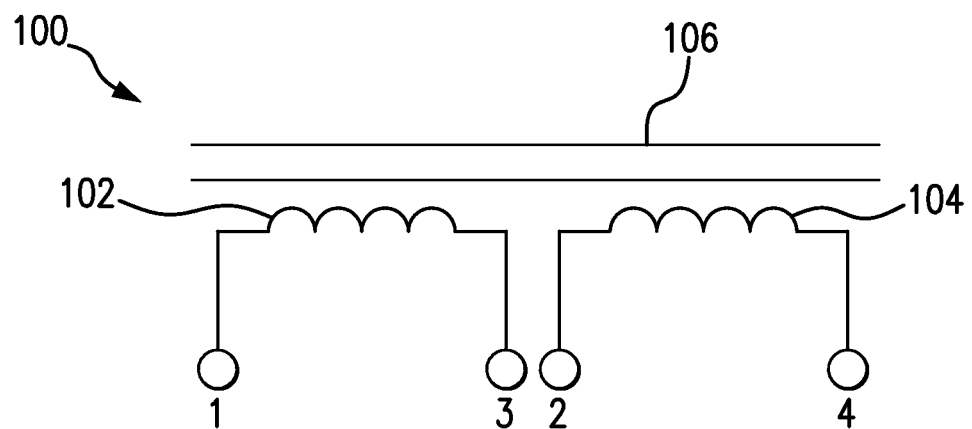
FIG. 1B is a schematic diagram illustrating the DC Phaseback choke of FIG. 1A.

Additionally, with reference to FIGS. 1A-1B, choke 100 can have four nodes 1, 2, 3, 4, with each coil 102, 104 or coil portion having two nodes. As such, and as embodied herein, first coil 102 can have nodes 1, 3 and second coil can have nodes 2, 4. As depicted in FIG. 1A, first coil 102 can be wound in parallel opposing configuration. In this manner, node 1 of first coil 102 and node 2 of second coil 104 can be disposed proximate each other at a first end of common core 106, and node 3 of first coil 102 and node 4 of second coil 104 can be disposed proximate each other at an opposing end of common core 106.

Furthermore, and as embodied herein, each coil 102, 104 can be formed from a length of wire, such as copper wire. Various lengths and sizes of wire can be utilized, and the length and size of wire utilized can be determined based on application, for example based on a maximum amount of current to flow through the wire. For purpose of illustration and not limitation, each coil 102, 104 or coil portion can be formed having a length L of up to 50 feet of 18-gauge copper wire to accommodate up to 14-amp loads, up to 50 feet of 16-gauge wire to accommodate up to 18-amp loads, up to 50 feet of 12-gauge wire to accommodate up to 30-amp loads, and up to 50 feet of 10-gauge wire to accommodate up to 40-amp loads. For example, and as embodied herein, length L of each coil 102, 104 can be 2.0" to 3.2". Additionally, for example and without limitation, each coil 102, 104 can have a width W of about 0.5" across an inner cross-dimension and within a range of about 2.0" to 3.0" across in outer cross-dimension, which can depend at least in part on the gauge size of the wire. For example, and as embodied herein, width W can be 0.5" across the inner cross-dimension and 2.0" across an outer cross-dimension. In some embodiments, common core 106 can be formed from, for example and without limitation, soft iron, ferrite or other suitable permeable iron core materials. Furthermore, and as embodied herein, the core 106 can have a length approximately equal to the length L of each coil 102, 104. The width of the core 106 can vary, for example based on the density of the core and the maximum amount of current to flow through the core. For example, and as embodied herein, the core 106 can have a cross-dimension of 0.5" and a length of 2.0".

With continued reference to FIG. 1A, Each of first and second coil 102, 104 or coil portion can be wound continuously in parallel. As such, first and second coil 102, 104 or coil portion can have an equal inductance and/or equal reactance. Additionally or alternatively, first and second coil 102, 104 or coil portion can have mutual inductance between each other. In operation, the direction of current can flow in series opposing between first coil 102 and second coil 104, and the mutual inductance can be parallel opposing between first coil 102 and second coil 104. In this manner, a total inductive reactance from the series and parallel opposing magnetic fields can cancel electrical noise in the coils, for example and embodied herein as any AC components of the current and voltage.

Referring now to FIG. 2, as embodied herein, choke 100 can include a filter capacitor 108 connected in parallel with the first coil 102 and second coil 104. Filter capacitor 108 can have a capacitance between about 15,000 µF and 4 F, which can be based at least in part on an amount of ride-through to be utilized by the power supply and load. In some embodiments, the filter capacitor 108 can have a capacitance of about 15,000 µF. In operation, filter capacitor 108 can operate to resist or prevent spikes in current and/or voltage.

In accordance with another aspect of the disclosed subject matter, a DC Phaseback choke is provided. The DC circuit can include a DC power supply having a current output terminal, a load device having a current input terminal, and a Phaseback DC choke having a first node, a second node, a third node, and a fourth node. The choke includes a common core having a first end and a second end, a first coil formed about the common core and defining the first node proximate the first end and the third node proximate the second end, and a second coil formed about the common core in parallel opposing configuration relative the first coil and defining the second node proximate the first end and the fourth node proximate the second end. The current output terminal of the power supply is joined to the first coil at the first node, the current input terminal of the load device is joined to the second coil at the second node, and the third node is joined to the fourth node.

For example and without limitation, an exemplary DC circuit 200 for use with choke 100 according to the disclosed subject matter is depicted in FIG. 2. As shown in FIG. 2, circuit 200 can include a DC power supply 202, choke 100, and a load 204. DC power supply 202, choke 100 and load 204 can be connected in a series configuration. In this manner, a current output terminal of power supply 202 can be joined to first coil 102 at node 1. A current input terminal of load 204 can be joined to second coil 104 at node 2. Node 3 of first coil 102 can be joined to node 4 of second coil 104. As such, in operation, as described herein, current I1 output from power supply 202 through first coil 102 can flow in series and opposing current I2 flowing through second coil 104 to current input terminal of load 204. The Phaseback DC choke can include any of the features described herein.

Systems and methods described herein can be used for a variety of industrial applications, including but not limited to any DC circuit applications. For example, the systems and methods described herein can be used to reduce or prevent AC noise in DC circuits, including and without limitation nanoscale DC circuits, which can be relatively sensitive to AC noise in DC circuits.

In addition to the specific embodiments claimed below, the disclosed subject matter is also directed to other embodiments having any other possible combination of the dependent features claimed below and those disclosed above. As such, the particular features disclosed herein can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A DC circuit, comprising:
    a DC power supply having a current output terminal;

a load device having a current input terminal; and
a Phaseback DC choke having a first node, a second node, a third node, and a fourth node, the choke comprising:
  a common core having a first end and a second end;
  a first coil formed about the common core and defining the first node proximate the first end and the third node proximate the second end; and
  a second coil formed about the common core in an opposing configuration relative the first coil and defining the second node proximate the first end and the fourth node proximate the second end such that a direction of a current through the first and second coils flows in series opposing between the first coil and the second coil, wherein magnetic fields formed by the current through the first coil and the second coil are parallel opposing, and wherein the first coil and the second coil have an equal number of windings;
  wherein the current output terminal of the power supply is joined to the first coil at the first node, the current input terminal of the load device is joined to the second coil at the second node, and the third node is joined to the fourth node.

2. The circuit of claim 1, wherein the first coil and the second coil are configured as a single coil having a first coil portion and a second coil portion.

3. The circuit of claim 1, wherein the first coil and the second coil are configured as two separate coils.

4. The circuit of claim 3, wherein the two separate coils have a coefficient of coupling of about 1.

5. The circuit of claim 1, wherein the first and second coils each comprise copper wire.

6. The circuit of claim 1, wherein the common core comprises soft iron.

* * * * *